April 18, 1961  J. M. BECK  2,980,043
PRECISION SEED PLANTER
Filed Feb. 12, 1958  2 Sheets-Sheet 1

INVENTOR
JOHN MELVIN BECK

BY Cushman, Darby & Cushman
ATTORNEYS

April 18, 1961 J. M. BECK 2,980,043
PRECISION SEED PLANTER
Filed Feb. 12, 1958 2 Sheets-Sheet 2
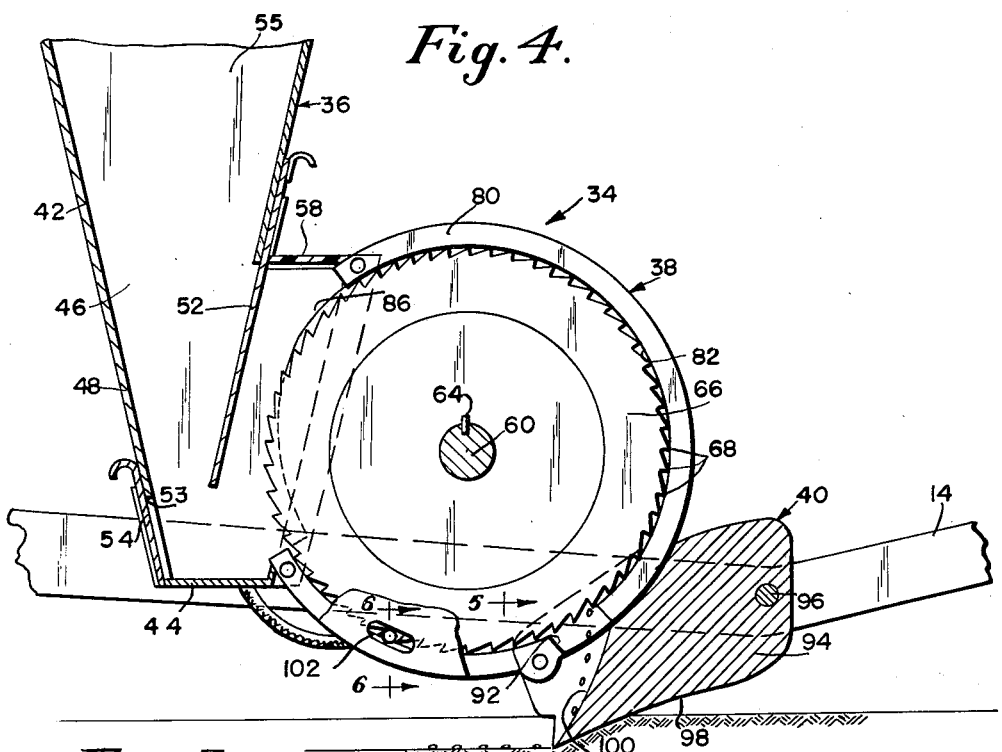
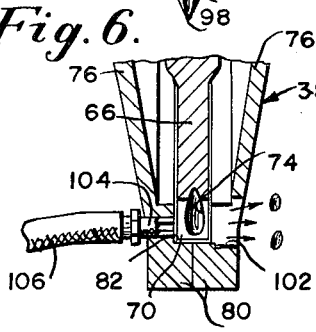
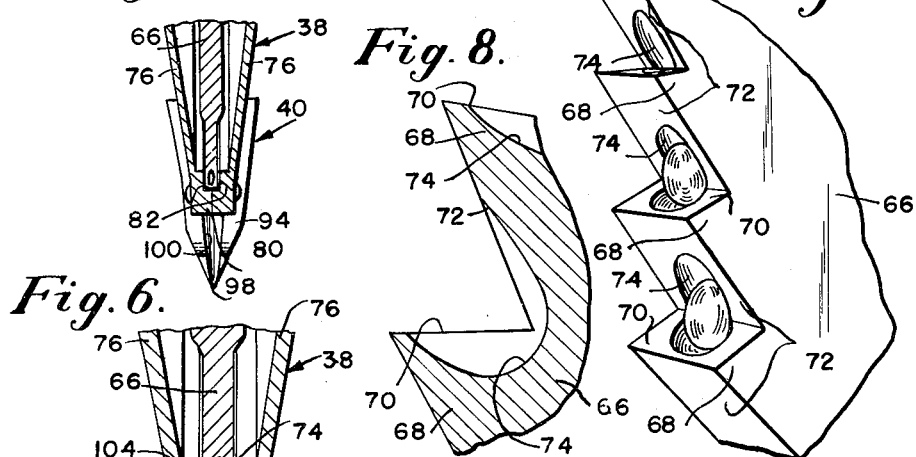
INVENTOR
JOHN MELVIN BECK
BY *Cushman, Darby & Cushman*
ATTORNEYS

United States Patent Office 2,980,043
Patented Apr. 18, 1961

2,980,043

PRECISION SEED PLANTER

John Melvin Beck, 214 N. Main St., Nyssa, Oreg.

Filed Feb. 12, 1958, Ser. No. 714,889

8 Claims. (Cl. 111—77)

This application relates to agricultural implements and more particularly to improvements in agricultural implements for depositing seeds in the ground.

Planting implements are well known and have been in use for many years. The known implements are generally operable to deposit an over abundance of seeds, which, when they germinate into small plants, are thinned down by various methods. Heretofore, such procedure was regarded as necessary due to the probability that a good percentage of the seeds deposited would fail to germinate. In recent years, seeds have been developed to the point that over 90% are guaranteed to germinate. With the use of such seeds it becomes possible, by precisely pinpointing the position at which the seeds are deposited into the ground, to reduce to a minimum, or entirely eliminate, the necessity to subsequently thin out the plants. In this way, a substantially greater yield can be obtained.

Accordingly, it is an object of the present invention to provide a seed planting implement having improved means for depositing the seeds in the precise position desired in the ground.

In general, the present invention contemplates the provision of a seeder disk having a plurality of circumferentially spaced teeth, each being arranged to pick up a seed from a source of supply during the rotation of the disk and deposit the same at a predetermined time so that it can be guided into proper position in the ground. It will be understood that in order to deposit the seeds in properly spaced relation along a furrow, each tooth of the disk must properly function to pick up a single seed and deposit the same at the proper time.

The seed planters of the toothed disk type heretofore proposed have all failed to properly function as a precision seed planter for the reason that each tooth either failed to pick up a seed or picked up too many seeds from the source of supply. In some instances, the seeds properly picked up from the source of supply became lodged in position or otherwise failed to discharge properly. Such malfunctions have been found to be due in part to the manner in which the source of supply is presented to the disk for the purpose of picking up the individual seeds in part to the construction of the seed pockets on the disk, and in part to the manner in which they are discharged.

Accordingly, it is another object of the present invention to provide a seed planter of the type described having improved means for presenting the source of seed supply to the seeder disk so as to insure that a single seed will be picked up by each seed pocket of the disk during its rotation.

Still another object of the present invention is the provision of a seed planter of the type described having a seeder disk provided with seed pockets of improved construction which insure the proper picking up, carrying, and discharging of the seeds.

A further object of the present invention is the provision of a seed planter of the type described having improved means for guiding the seeds discharging from the seeder disk into proper position in the ground.

A still further object of the present invention is the provision of a seed planter of the type described having means for preventing the seeds from becoming lodged or otherwise retained in position within the seed pockets of the seeder disk.

A still further object of the present invention is the provision of a seed planter of the type described which is simple in construction, efficient in operation, and economical to manufacture and maintain.

These and other objects of the present invention will become more apparent during the course of the following detailed description and appended claims.

The invention may best be understood with reference to the accompanying drawings wherein an illustrative embodiment is shown.

In the drawings:

Figure 4 is an enlarged, fragmentary vertical sectional view of the seed depositing mechanism of the implements with certain parts broken away;

Figure 5 is an enlarged, fragmentary, cross-sectional view taken along the line 5—5 of Figure 4;

Figure 6 is an enlarged, fragmentary, cross-sectional view taken along the line 6—6 of Figure 4;

Figure 7 is an enlarged, fragmentary, perspective view of the seeder disk; and

Figure 8 is an enlarged, fragmentary, vertical sectional view showing a seed pocket of the seeder disk.

Figure 1:
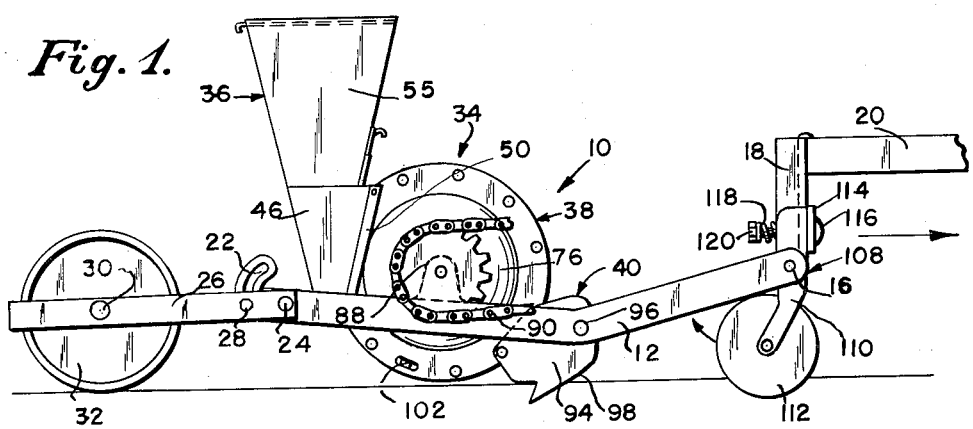
Figure 1 is a side elevational view of a seed planting implement embodying the principles of the present invention.
Figure 2:
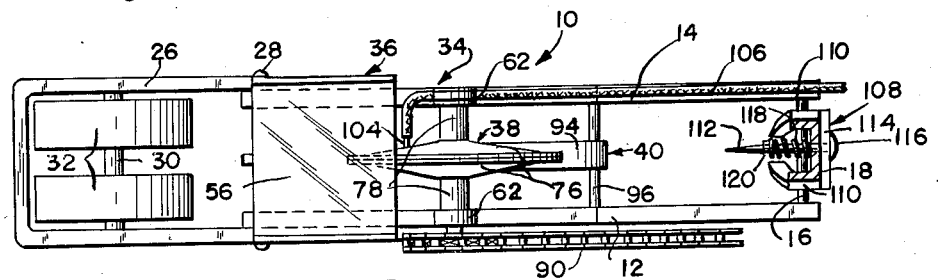
Figure 2 is a top plan view of the implement with parts in section.
Figure 3:
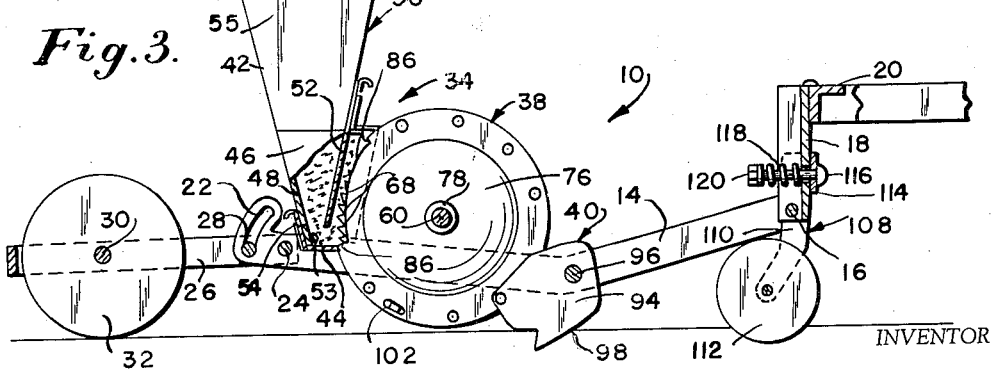
Figure 3 is a vertical sectional view of the implement with certain parts broken away.

Referring now more particularly to the drawings, there is shown in Figures 1–3 a seed planting implement, generally indicated at 10, embodying the principles of the present invention. The implement includes a pair of transversely spaced, longitudinally extending frame members 12 and 14, which constitute a portion of the frame of the implement. Extending between the forward ends of the frame is a rod 16 which serves as a pivotal hitch for the implement. The rod is arranged to pivotally connect with the lower end of a vertical standard 18 of channel construction, the upper end of which is arranged to be rigidly secured by any suitable means, to the draw bar 20 of a tractor or the like (not shown).

The rear ends of the frame members are vertically enlarged and provided with slots 22 arcuate about the axis of a pin 24 extending between the frame members just forwardly thereof. A generally U-shaped frame member 26 has its free ends suitably apertured to receive the pin 24 and a bolt 28 extends through each leg of the frame member 26 and the adjacent arcuate slot 22. Extending between the rear portion of the legs of the frame member 26 is an axle shaft 30 which carries a pair of ground engaging press wheels 32 of conventional construction. It will be understood that the rear end of the frame members 14 can be maintained by the wheels 32 in different vertical positions of adjustment by locking the frame member 26 in different positions of pivotal adjustment about the pin 24 within the limits of slots 22 by suitably loosening and tightening the bolts 28.

The present invention is more particularly concerned with a novel seed depositing mechanism, generally indicated at 34, carried by the central portion of the frame members 12 and 14. In general, the seed depositing mechanism 34 includes a hopper assembly 36 for receiving a supply of seeds and presenting them in proper condition to a pick up station, a seeder disk assembly 38 for picking up the seeds presented by the hopper assembly 36 at the pick up station and conveying the same to a depositing station, and a planter sword assembly 40 for forming a furrow in the ground and guiding the seeds conveyed by the seeder disk assembly 38 to the depositing station into the furrow.

The hopper assembly 36 comprises a seed receptacle 42 having a lower portion made up of a bottom wall 44, parallel vertical walls 46 extending upwardly therefrom, an inclined rear wall 48, extending upwardly from the bottom between the rear edges of the vertical walls, and a pair of centrally spaced inclined forward wall sections 50 extending upwardly and forwardly from the bottom wall between the forward edges of the vertical walls. A gate 52 preferably in the form of a flat plate is mounted, by any suitable means, in spaced relation rearwardly of the forward wall sections 50 for sliding movement in a plane parallel therewith. The gate 52 divides the receptacle 42 into a rearward supply chamber and a forward feed chamber.

The lower portion of the rear wall is formed with a discharge opening 53 which is normally closed by a sliding gate 54 or the like. The gate 54 is moved upwardly to expose the opening 53 and permit unused seed to be discharged when desired.

The receptacle 42 also includes an upper portion, preferably constructed of walls 55 in the shape of an inverted truncated pyramid forming an upward extension of the supply chamber. The supply chamber is closed by a cover 56 which is preferably of a relatively transparent material, such as clear plastic or the like, to enable the operator to view the seed level therein. The cover 56 is mounted on the upper end of the supply chamber in any suitable manner for movement between opened and closed positions and, as shown, the walls 55 are arranged to horizontally slidably receive the cover. In a like manner, the upper end of the feed chamber has a clear plastic cover 58 or the like mounted on the upper end of the feed chamber to enable the operator to view the seed level therein (see Figure 4).

The seeder disk assembly 38 includes a transverse shaft 60 journalled on the central portion of the frame members, as by bearings 62 or the like. Secured to the central portion of the shaft 60, as by key 64 or the like, is a seeder disk 66 having a peripheral marginal portion of reduced thickness. Formed in the outer peripheral extremity of the reduced marginal portion is a plurality of teeth 68, each tooth defining an inwardly extending generally radially extending surface 70 and an angular surface 72 extending from the inner end of the radial surface outwardly to the periphery of the disk.

As best shown in Figures 7 and 8, a seed pocket 74 is formed in each tooth of the disk by any suitable operation, such as drilling or the like. Preferably, each pocket is formed adjacent the intersection of the associated surfaces 70 and 72 so as to provide a recess in each of the tooth-defining surfaces between the end surfaces of the associated tooth.

Mounted on opposite sides of the seeder disk 66 is a pair of opposed concavo-convex cover disks 76, each having a central hub 78 journalled on the shaft 60 and a peripheral flange 80 extending inwardly thereof. As best shown in Figures 4–6, the cover disks 76 are secured together, by any suitable means such as bolts or the like extending between the peripheral flanges 80. Opposed annular grooves 82 are formed in the inner portion of the flanges 80, which together serve to receive and surround the teeth 68 of the seeder disk in closely spaced relation thereto.

The peripheral flanges 80 of the disks 76 have a cut-out sector 86 formed in the rearward peripheral portion thereof which serves to communicate the seed pockets of the seeder disk with the feed chamber of the hopper assembly. It will be noted that the spaced forward end wall sections 50 of the receptacle 42 are suitably fixed to the exterior of the disks 76 to thereby close the forward end of the feed chamber in surrounding relation to the adjacent teeth of the seeder disk. The seeder disk is rotated by any suitable means, such as a sprocket wheel 88 fixed to one end of the shaft 60 and a chain 90 trained thereabout and about a suitable driving sprocket wheel (not shown) carried by the propelling vehicle or hitch structure thereof, in a clockwise direction, as viewed in Figure 4, so that the teeth 68 pass upwardly through the feed chamber of the hopper assembly.

It will be noted that the cut out sector 86 is formed so that the flanges are disposed inwardly of the roots of the teeth 68 at the bottom portion of the feed chamber to thereby permit free movement of seeds across the teeth. At a position approximately one-third of the height of the feed chamber the flanges are cut to gradually curve outwardly until at the upper portion of the feed chamber they extend to the tips of the teeth and therefore prevent movement of the seeds thereacross.

At the seed discharge station, the flanges 80 of the cover disks are grooved, as indicated at 92, to form an outwardly extending passage through which the seeds carried in the pockets 74 are discharged. The planter sword assembly 40 is mounted on the frame members in a position to receive the seeds as they are discharged from the seeder disk through the passage 92 and to guide them into proper position within the furrow in the ground.

To this end, the planter sword assembly includes a boot or sword 94 having its forward end fixedly mounted between the frame members by any suitable means such as a rod 96 or the like extending between the frame and through the sword. Extending downwardly and rearwardly from the forward end of the sword is a cutting edge 98 and the exterior surface of the sides of the sword diverge upwardly therefrom. At the rear end of the sword, a seed receiving groove 100 is formed which is shaped to guide the seed downwardly to be deposited in the furrow at a position just rearwardly of the rear end of the cutting edge 98. The forward end of the groove is convexly arcuate and extends downwardly and rearwardly and is relatively narrow. From its forward end the groove diverges rearwardly and converges downwardly. This configuration has a funnelling effect which guides or directs the seeds into the furrow with a high degree of precision.

Disposed adjacent the lower periphery of the seeder disk assembly 38 between the hopper assembly and the planter sword assembly is a means for effectively removing seeds which have not discharged properly from the seed pockets within which they are disposed. To this end, a circumferentially elongated opening 102 is formed in one of the cover disks 76 in alignment with the teeth of the seeder disk 66. The other cover disk is suitably apertured at a position opposed from the opening 102 to receive a nozzle or discharge end 104 of an air hose 106 which extends forwardly to the tractor to a suitable source of compressed air (not shown). While the seed removing means is shown as being positioned substantially midway between the hopper assembly and planter sword assembly, it will be understood that this position may be readily varied. For example, the seed removing means may be positioned adjacent the sword at the point where the seeds are discharged therein.

Preferably, the present planting implement is provided with a yieldable colter assembly 108 in advance of the sword 94 to cut trash and other debris prior to the formation of the furrow. The colter assembly includes a pair of transversely spaced colter carrying arms 110 pivoted intermediate their ends to the pin 16 for pivotal movement thereabout. The upper ends of the arms are disposed outside the standard 18 and their lower ends converge downwardly to rotatably receive therebetween a disk colter 112 of conventional construction. A bar 114 is rigidly secured to the forward upper edges of the arms, as by welding or the like, and extends across the forward surface of the standard. Extending rearwardly through suitably aligned apertures in the bar 114 and standard 18 is a bolt 116 having a coil spring 118 mounted on the rear end thereof with its forward end in engagement with the standard. The rear end of the spring is engaged by a nut 120 threaded on the bolt to adjust the pressure applied by the spring tending to retain the bar in engagement with the standard and hence the colter in proper trash clearing position.

*Operation*

In operation, the implement 10 of the present invention is connected to the draw bar or other hitch structure of a conventional tractor so as to be moved therewith usually in trailing relation. It will be noted that the implement is pivotally carried at its forward end by the hitch pin 16 and supported at its rear end on the ground by the press wheels 32. In addition, the chain 90 is connected to be driven at a desired speed from power supplied by the tractor and the air hose 106 is connected to a suitable source of compressed air supplied by the tractor.

During the forward movement of the implement, the colter assembly 108 serves to initially cut the ground so as to insure that all trash and other debris will be severed before being contacted by the planter sword. The colter assembly is operable to yield through the action of the spring 118 when the disk 112 encounters an obstruction.

The seed depositing mechanism 34 is operable during the forward movement of the implement to form a furrow in the ground and deposit seeds therein accurately at predetermined positions. The press wheels 32 serve to cover the furrow and press the soil down over the seed.

The operation of the seed depositing mechanism 34 is a particularly significant feature of the present invention. In general, the novel cooperation between the feed chamber of the hopper assembly 36 and the seeder disk 66 insures that a single seed will be picked up by each pocket 74 of the disk. The particular configuration of the pocket is of importance in this regard as well as the proper conveying of the seeds to the discharge station and the discharging procedure itself. The cooperation between the seeder disk and the planter sword assembly enhances the likelihood of proper discharge and insures proper positioning of the discharging seeds in the ground. Finally, the air blast arrangement insures that when a seed does become clogged in a seed pocket, this condition does not persist beyond one revolution of the seeder disk.

The upward movement of the teeth of the seeder disk through the feed chamber has the effect of agitating the seed therein. The position of the gate 52 determines the seed level in the feed hopper for any given rotational speed of the seeder disk and the seed level is significant in the pick up of the seeds. By proper selection of the seed level, the entire bed of seeds in the feed hopper are retained in a more or less fluidized state by the agitation and movement of the seeder disk teeth therethrough. This lessens the likelihood that two or more seeds will become jammed in one seed pocket. At the same time this condition also lessens the likelihood that the pockets will pass through the feed chamber without picking up a single seed. The configuration of the pockets also serves to lessen these likelihoods. It will be noted that the pockets are formed with both of the angularly related surfaces defining the teeth recessed so that once a seed has entered the pocket it is retained therein against lateral movement. The recessing of the angular surface 72 is particularly advantageous in maintaining the seed in the pocket since the walls defining this recess engage the upper portion of the seed. Finally, the shape of the cut out 86 of the flanges 80, which, first, permits free movement of the seeds across the faces of the teeth and then, gradually, prohibits such movements, enhances the positioning of a single seed in each pocket.

As the seeds are carried from the pick up station to the discharge station, their primary support shifts from the recess in the surface 70 to the recess in the surface 72. The latter recess merges smoothly into the adjacent surface 72 which permits the recess to readily move out of the pocket as the discharge station is approached.

The seeds discharging from the pockets enter the groove in the planter sword which converges forwardly and downwardly. In this way the configuration of the groove guides the seeds so that they are deposited at equal intervals at a position adjacent the end of the cutting edge of the sword.

The operation of the clogged seed removing means is such that a continuous blast of compressed air is blown from the nozzle 104 to the opening 102 in the path of movement of the seed pockets. If a seed fails to discharge properly and is retained in a pocket, the seed will be removed by the air blast when the pocket moves into the path thereof.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. In a seed depositing mechanism for a seed planter comprising a hopper assembly for receiving a supply of seeds, a movable gate dividing said hopper assembly into a supply chamber and a feed chamber communicating with the lower portion of said supply chamber, a seeder disk assembly communicating with one end of said feed chamber, and a planter sword, the improvement comprising said seeder disk assembly including a rigid seeder disk having a plurality of teeth formed on the outer periphery thereof, said disk being rotatable about its axis and positioned with respect to said feed chamber so that said teeth pass upwardly through said feed chamber, each of said teeth being formed by a pair of angularly related intersecting planar surfaces having a pocket bridging the teeth adjacent the intersection of the teeth at their roots, said pocket being of a width less than the width of said disk, said planter sword having a groove formed therein disposed in a position to communicate with the pockets of said seeder disk during the rotation of the latter to receive the seeds discharging from said pockets and guide the same into proper position in the ground.

2. A seed depositing mechanism as defined in claim 1 wherein said gate is mounted for sliding movement toward and away from the lower portion of said feed chamber to increase or decrease the communication between said chambers and hence control the seed level in said feed chamber.

3. A seed depositing mechanism as defined in claim 1 wherein means is provided adjacent the lower periphery of said disk between said hopper assembly and said sword for directing a continuous blast of air across the path of movement of said teeth and pockets.

4. A seed depositing mechanism as defined in claim 1 wherein said seeder disk assembly further includes a pair of opposed cover disks fixedly mounted on opposite sides of said seeder disk, said cover disks having inwardly extending peripheral flanges secured together, said flanges having communicating annular grooves formed therein for closely receiving the teeth of said seeder disk, the flanges of said cover disk being cut away adjacent said feed chamber and said sword groove to permit communication of said teeth therewith.

5. A seed depositing mechanism as defined in claim 1 wherein said hopper assembly further comprises a bottom wall, a pair of spaced vertical walls extending upwardly therefrom, end walls between the ends of said vertical walls diverging upwardly from said bottom wall, said walls and said gate defining said feed chamber and the lower portion of said supply chamber, and an inverted truncated pyramidal wall structure defining the upper portion of said supply chamber.

6. A seed depositing mechanism as defined in claim 5 wherein a clear plastic cover is provided on the upper end of said supply chamber and said feed chamber.

7. A seed depositing mechanism for a seed planter comprising a seed receptacle, a seeder disk assembly communicating with said receptacle, said assembly including a rigid unitary disk having a plurality of circumferentially spaced seed pockets formed therein, said pockets bridging the teeth adjacent the intersection of said teeth at their roots, said disk being rotatably mounted about its axis so that the pockets thereon move upwardly through a portion of the receptacle to pick up seeds therefrom and carry the same to a discharge position for deposit into the ground, and means adjacent the lower periphery of said disk between said receptacle and said discharge station for clearing said pockets of seeds clogged therein.

8. A seed depositing mechanism as defined in claim 7 wherein said seed clearing means comprises an air directing nozzle disposed to discharge in the path of travel of said pockets.

References Cited in the file of this patent
UNITED STATES PATENTS

| | | |
|---|---|---|
| 129,383 | Wight et al. | July 16, 1872 |
| 392,928 | Mussetter | Nov. 13, 1888 |
| 690,213 | Stewart | Apr. 26, 1898 |
| 1,637,834 | Oliver | Aug. 2, 1927 |
| 2,302,499 | Lacson | Nov. 17, 1942 |
| 2,645,385 | Wechsler | July 14, 1953 |
| 2,667,286 | Raught | Jan. 26, 1954 |
| 2,855,125 | Grimsbo | Oct. 7, 1958 |

FOREIGN PATENTS

| | | |
|---|---|---|
| 492,517 | Italy | Mar. 27, 1954 |